US010133062B2

United States Patent
Zhu et al.

(10) Patent No.: US 10,133,062 B2
(45) Date of Patent: Nov. 20, 2018

(54) METHOD OF LED FREEFORM SURFACE ILLUMINATION SYSTEM BASED ON XY-POLYNOMIAL

(71) Applicants: Tsinghua University, Beijing (CN); HON HAI PRECISION INDUSTRY CO., LTD., New Taipei (TW)

(72) Inventors: Jun Zhu, Beijing (CN); Si-Si Xiong, Beijing (CN); Xiao-Fei Wu, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 269 days.

(21) Appl. No.: 14/709,854

(22) Filed: May 12, 2015

(65) Prior Publication Data

US 2015/0362725 A1    Dec. 17, 2015

(30) Foreign Application Priority Data

Jun. 13, 2014   (CN) .......................... 2014 1 0263035

(51) Int. Cl.
  *G02B 27/00*   (2006.01)
  *G02B 27/09*   (2006.01)
  *G02B 19/00*   (2006.01)

(52) U.S. Cl.
  CPC ..... *G02B 27/0012* (2013.01); *G02B 19/0014* (2013.01); *G02B 19/0061* (2013.01); *G02B 27/0927* (2013.01)

(58) Field of Classification Search
  CPC ............ G02B 27/0012; G02B 19/0014; G02B 19/0061; G02B 27/0927
  See application file for complete search history.

(56) References Cited

U.S. PATENT DOCUMENTS

| 6,697,539 B1 * | 2/2004 | Dolan ................... G06T 3/4007 |
| | | 382/236 |
| 7,819,533 B2 * | 10/2010 | Suzuki ..................... G02B 3/04 |
| | | 353/102 |

(Continued)

OTHER PUBLICATIONS

Duerr, Fabian, et al. "Analytic free-form lens design for imaging applications with high aspect ratio." (2012): 1-7.*
Bao Zhi-cong et al, The design of freeform surface lens for LED lighting system, International Symposium on Photoelectronic Detection and Imaging 2013. SPIE vol. 8913. Jun. 25, 2013.*

(Continued)

*Primary Examiner* — Aniss Chad
*Assistant Examiner* — Chuen-Meei Gan
(74) *Attorney, Agent, or Firm* — ScienBiziP, P.C.

(57) ABSTRACT

A design method of LED freeform surface illumination system based on XY-polynomial obtains a plurality of data points of a freeform surface, wherein each data point includes a coordinate value $Q_i$ and a normal vector $N_i$. A sum of squares $e_1(P)$ of coordinate differences in z direction between the coordinate value $Q_i$ and the freeform surface is applied, and by a sum of squares $e_2(P)$ between the normal vector $N_i$ of the data points and normal vector $n_i$ of the freeform surface a modulus of vector differences is acquired. An evaluation function $f(p)=e_1(P)+we_2(P)$ is proposed and a plurality of freeform surface shapes obtained by selecting different weightings. The freeform surface shape which has the best imaging quality is achieved as a final shape, and a freeform surface lens based on the final shape is constructed to establish an LED freeform surface illumination system.

6 Claims, 11 Drawing Sheets

(56) References Cited

U.S. PATENT DOCUMENTS

| | | | | |
|---|---|---|---|---|
| 8,089,221 B2* | 1/2012 | Schulz | ............... | G01J 3/10 |
| | | | | 315/307 |
| 2003/0067461 A1* | 4/2003 | Fletcher | ............... | G06T 17/20 |
| | | | | 345/420 |
| 2003/0111533 A1* | 6/2003 | Chang | ............... | H05B 33/086 |
| | | | | 235/454 |
| 2010/0073934 A1* | 3/2010 | Ho | ............... | F21L 15/02 |
| | | | | 362/311.1 |
| 2010/0164387 A1* | 7/2010 | Shulz | ............... | G01J 3/10 |
| | | | | 315/151 |
| 2012/0081800 A1* | 4/2012 | Cheng | ............... | G03B 21/00 |
| | | | | 359/720 |
| 2015/0094993 A1* | 4/2015 | Zhu | ............... | G06F 17/50 |
| | | | | 703/1 |
| 2015/0363973 A1* | 12/2015 | Zhu | ............... | G06T 17/30 |
| | | | | 345/419 |

OTHER PUBLICATIONS

Tong Yang et al, Direct design of freeform surfaces and freeform imaging systems with a point-by-point three-dimensional construction-iteration method. Optical Society of America. vol. 33 No. 8. Apr. 20, 2015.*

F.Z. Fang et al, Manufacturing and measurement of freeform optics. CIRP Annals—Manufacturing Technology 62 (2013) 823-846.*

Yi Ding et al, Freeform LED lens for uniform illumination, Optics Express vol. 16 No. 17, Aug. 2008, 12958-12966.*

Fang et al, Manufacturing and measuremnet of freeform optics, CIRP Annals—Manufacturing Technology 62 (2013) 823-846.*

G. W. Forbes, Characterising the shape of freeform optics, Jan. 30, 2012, vol. 20, No. 3, Optics Express 2483-2499.*

Ramesh Jain et al, Machine VIsion, McGraw-Hill Inc, ISBN 0-07-032018-7, 1995.*

John Develist, Comparison of Methods for image evaluation, Journal of the optical society of america, vol. 55 No. 2, Feb. 1965.*

* cited by examiner

101 — Obtain a plurality of data points of a freeform surface according to an LED point light source and an illuminated field on a receiving surface formed by the LED point light source in a three-dimensional Cartesian coordinate system Oxyz, wherein light emitted from the LED point light source and passing through the freeform surface provides a uniform illumination to the illuminated field, each of the plurality of data points comprises a coordinate value $Q_i=(x_i, y_i, z_i)(i=1, 2, ..., n)$ and a normal vector $N_i=(u_i, v_i, -1)(i=1, 2, ..., n)$, and the freeform surface is expressed in terms of $z=f(x,y,P)=\sum_{i,j=0} P_{i,j} x^i y^j$ 102 — Acquire a first sum of squares, which is represented by a function $e_1(P)$, of coordinate differences in z direction between the coordinate value $Q_i=(x_i, y_i, z_i)$ $(i=1, 2, ..., n)$ and the freeform surface 103 — Acquire a second sum of squares, which is represented by a function $e_2(P)$, of modulus of vector differences between the normal vector $N_i=(u_i, v_i, -1)(i=1, 2, ..., n)$ of the plurality of data points and a normal vector $n_i$ of the freeform surface 104 — Propose an evaluation function $f(p)=e_1(P)+we_2(P)$, wherein w is a weighting greater than 0

105 — Select different weightings w, and then set a gradient of the evaluation function $f(p)$ equal to 0 to obtain a plurality of different values of P and a plurality of freeform surface shapes $z=f(x, y; P)$ corresponding to each of the plurality of different values of P 106 — Choosing a final freeform surface shape $\Omega_{opt}$ from the plurality of freeform surface shapes $z = f(x, y; P)$, wherein the final freeform surface shape $\Omega_{opt}$ has a best imaging quality 107 — Construct a freeform surface lens based on the final freeform surface shape $\Omega_{opt}$ and establish a LED freeform surface illumination system comprising the freeform surface lens

FIG. 1

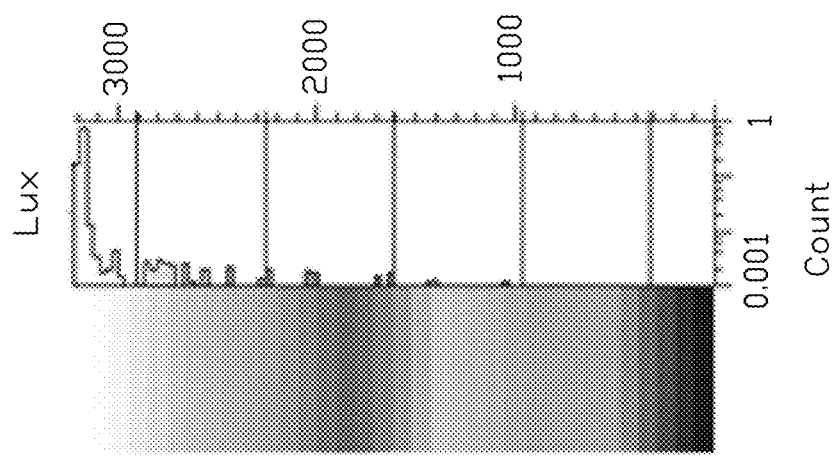
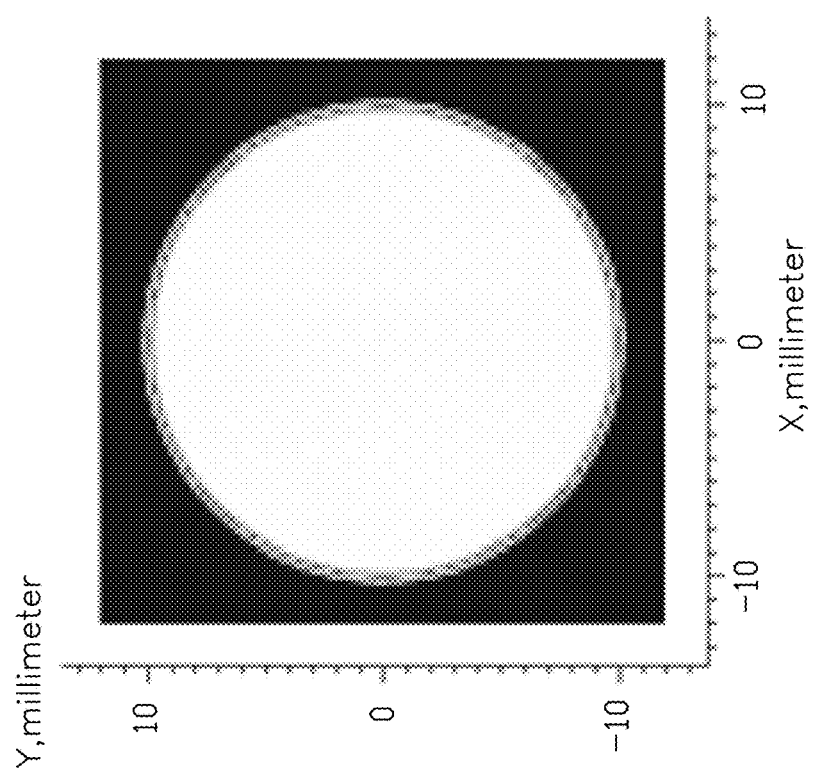
FIG. 10

METHOD OF LED FREEFORM SURFACE ILLUMINATION SYSTEM BASED ON XY-POLYNOMIAL

CROSS-REFERENCE TO RELATED APPLICATIONS

This application claims all benefits accruing under 35 U.S.C. § 119 from China Patent Application No. 201410263035.4, filed on Jun. 13, 2014 in the China Intellectual Property Office, disclosure of which is incorporated herein by reference. This application is related to common-assigned application entitled, "CONSTRUCTION METHOD OF FREEFORM SURFACE SHAPE BASED ON XY-POLYNOMIAL", filed May 12, 2015 U.S. Pat. Ser. No. 14/709861.

BACKGROUND

1. Technical Field

The present disclosure relates to a design method of LED freeform surface illumination system, and especially relates to a design method of LED freeform surface illumination system based on XY-polynomial.

2. Description of Related Art

Conventional design methods of LED freeform surface illumination system based on XY-polynomial include obtaining a plurality of data points (including coordinate values and normal vectors) of discrete points on a freeform surface through a differential equation method and surface fitting the plurality of data points by using a least square method. The freeform surface is finally obtained, and a lens comprising the freeform surface is constructed, so establishing an LED freeform surface illumination system. However, the conventional design methods may have a relatively large deviation in the normal vectors, corrupting the uniformity of illumination.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 1 is a flowchart of one embodiment of a design method of LED freeform surface illumination system based on XY-polynomial.

FIG. 10 is an illuminating effect image of a circular illuminated field formed through a freeform surface in the design method of LED freeform surface illumination system based on XY-polynomial in the third example.

DETAILED DESCRIPTION

Figure 2:
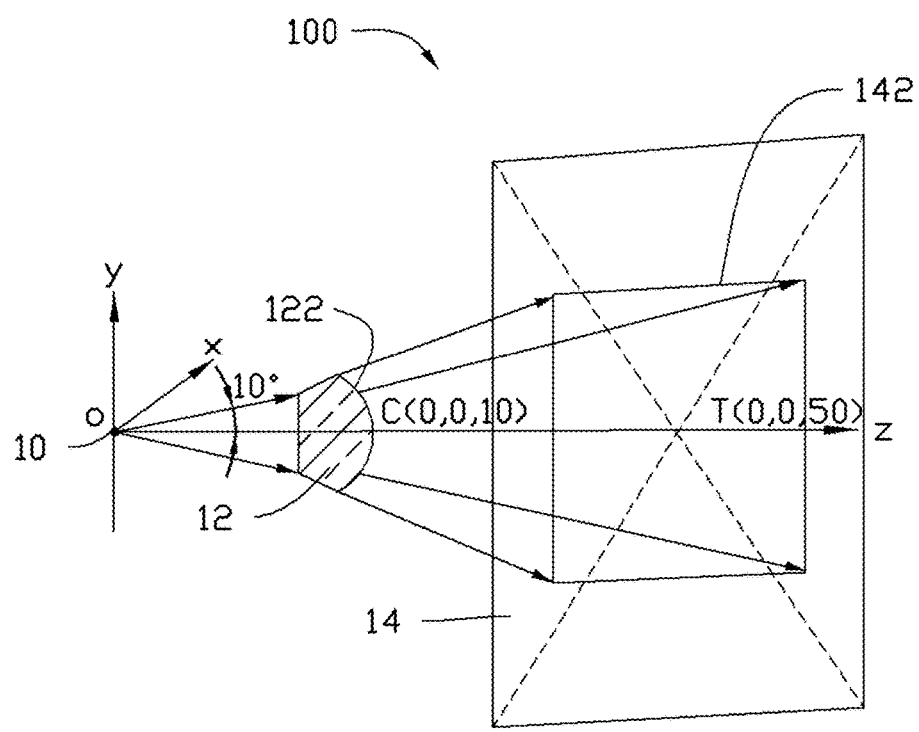
FIG. 2 is a schematic view showing a first example of an LED freeform surface illumination system in the design method of LED freeform surface illumination system based on XY-polynomial.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprise" or "comprising" when utilized, means "include or including, but not necessarily limited to"; it specifically indicates open-ended inclusion or membership in the so-described combination, group, series, and the like.

Referring to FIG. 1, a flowchart is presented in accordance with an embodiment of a design method of LED freeform surface illumination system based on XY-polynomial by way of example, as there are a variety of ways to carry out the method. Each block shown in FIG. 1 represents one or more processes, methods, or subroutines carried out in the exemplary method. Additionally, the illustrated order of blocks is by example only and the order of the blocks can be changed. The exemplary method can begin at block 101. Depending on the embodiment, additional steps can be added, others may be removed, and the ordering of the steps can be changed.

At block 101, a plurality of data points of a freeform surface are obtained according to an LED point light source and an illuminated field on a receiving surface formed by the LED point light source in a three-dimensional Cartesian coordinate system Oxyz. Light emitted from the LED point light source and passing through the freeform surface can provide a uniform illumination to the illuminated field. Each of the plurality data point comprises a coordinate value $Q_i=(x_i, y_i, z_i)(i=1, 2, \ldots, n)$ and a normal vector $N_i=(u_i, v_i, -1)(i=1, 2, \ldots, n)$. The freeform surface can be expressed in terms of the following equation:

$$z = f(x, y; P) = \sum_{i,j=0} P_{i,j} x^i y^j$$

where P is a XY-polynomial coefficient.

At block 102, a first sum of squares is applied, which can be represented by a function $e_1(P)$, of coordinate differences in z direction between the coordinate value $Q_i=(x_i, y_i, z_i)(i=1, 2, \ldots, n)$, and the freeform surface. The first sum of squares $e_1(P)$ can be expressed in terms of the following equation:

$$e_1(P) = \sum_{i=1}^{n} [z_i - f(x_i, y_i; P)]^2 = (Z - A_1 P)^T (Z - A_1 P)$$

Wherein $Z = [z_1 \ z_2 \ \ldots \ z_n]^T$ $$A_1 = \begin{bmatrix} 1 & x_1 & y_1 & x_1^2 & x_1 y_1 & y_1^2 & x_1^3 & x_1^2 y_1 & x_1 y_1^2 & y_1^3 & \ldots \\ 1 & x_2 & y_2 & x_2^2 & x_2 y_2 & y_2^2 & x_2^3 & x_2^2 y_2 & x_2 y_2^2 & y_2^3 & \ldots \\ & & & \ldots & & & \ldots & & \ldots & & \\ 1 & x_n & y_n & x_n^2 & x_n y_n & y_n^2 & x_n^3 & x_n^2 y_n & x_n y_n^2 & y_n^3 & \ldots \end{bmatrix}$$

$P = [P_{00} \ P_{10} \ P_{01} \ P_{20} \ P_{11} \ P_{02} \ P_{30} \ P_{21} \ P_{12} \ P_{03} \ \ldots]^T$ At block 103, a second sum of squares is applied, which can be represented by a function $e_2(P)$, of modulus of vector differences between the normal vector $N_i=(u_i, v_i, -1)(i=1, 2, \ldots, n)$ of the plurality of data points, and a normal vector $n_i$ of the freeform surface. The second sum of squares $e_2(P)$ can be expressed in terms of the following equation:

$$e_2(P) = \sum_{i=1}^{n} |N_i - n_i|^2 =$$

$$\sum_{i=1}^{n} \{[u_i - f_x(x_i, y_i; P)]^2 + [v_i - f_y(x_i, y_i; P)]^2\} = (U - A_2 P)^T (U - A_2 P) + (V - A_3 P)^T (V - A_3 P)$$

Wherein $n_i = (f_x(x, y; P), f_y(x, y; P), -1)$ $U = [u_1 \ u_2 \ \ldots \ u_n]^T$ $V = [v_1 \ v_2 \ \ldots \ v_n]^T$ $$A_2 = \begin{bmatrix} 0 & 1 & 0 & 2x_1 & y_1 & 0 & 3x_1^2 & 2x_1 y_1 & y_1^2 & 0 & 4x_1^3 & 3x_1^2 y_1 & 2x_1 y_1^2 & y_1^3 & 0 & \ldots \\ 0 & 1 & 0 & 2x_2 & y_2 & 0 & 3x_2^2 & 2x_2 y_2 & y_2^2 & 0 & 4x_2^3 & 3x_2^2 y_2 & 2x_2 y_2^2 & y_2^3 & 0 & \ldots \\ & & & & & \ldots & & & \ldots & & & \ldots & & & & \\ 0 & 1 & 0 & 2x_n & y_n & 0 & 3x_n^2 & 2x_n y_n & y_n^2 & 0 & 4x_n^3 & 3x_n^2 y_n & 2x_n y_n^2 & y_n^3 & 0 & \ldots \end{bmatrix}$$

$$A_3 = \begin{bmatrix} 0 & 0 & 1 & 0 & x_1 & 2y_1 & 0 & x_1^2 & 2x_1 y_1 & 3y_1^2 & 0 & x_1^3 & 2x_1^2 y_1 & 3x_1 y_1^2 & 4y_1^3 & 0 & \ldots \\ 0 & 0 & 1 & 0 & x_2 & 2y_2 & 0 & x_2^2 & 2x_2 y_2 & 3y_2^2 & 0 & x_2^3 & 2x_2^2 y_2 & 3x_2 y_2^2 & 4y_2^3 & 0 & \ldots \\ & & & & & \ldots & & & \ldots & & & \ldots & & & & & \\ 0 & 0 & 1 & 0 & x_n & 2y_n & 0 & x_n^2 & 2x_n y_n & 3y_n^2 & 0 & x_n^3 & 2x_n^2 y_n & 3x_n y_n^2 & 4y_n^3 & 0 & \ldots \end{bmatrix}$$

At block 104, an evaluation function $f(P)=e_1(P)+we_2(P)$ is applied, wherein w is a weighting greater than 0.

At block 105, different weightings w are selected, and then a gradient $\nabla f(P)$ of the evaluation function $f(p)$ is set equal to 0 to obtain a plurality of different values of P and a plurality of freeform surface shapes $z=f(x, y; P)$ corresponding to each of the plurality of different values of P.

At block 106, a final freeform surface shape $\Omega_{opt}$ which has a best imaging quality is chosen from the plurality of freeform surface shapes $z=f(x, y; P)$.

At block 107, a freeform surface lens entity is constructed based on the final freeform surface shape $\Omega_{opt}$ and an LED freeform surface illumination system comprising the freeform surface lens entity is established.

The plurality of data points can be obtained through a differential equation method or other methods. There are many different ways to obtain the plurality of data points in prior art which are not repeated here.

To satisfy both calculation accuracy and convenience, in one embodiment, a third order XY-polynomial curved surface, a fourth order XY-polynomial curved surface, a fifth order XY-polynomial curved surface, or a sixth order XY-polynomial curved surface are used as a prototype of the freeform surface.

In one embodiment, one half of an emitting angle of the LED point light source is less than or equal to 20°. In one embodiment, the one half of the emitting angle of the LED point light source is less than or equal to 10°. It is to be understood that if the one half of the emitting angle of the LED point light source is too large, the uniformity of illumination may be affected.

The evaluation function $f(p)$ is used to establish a comprehensive evaluation index to investigate and evaluate $e_1(P)$ and $e_2(P)$.

When the gradient $\nabla f(P)$ is 0, the evaluation function $f(P)$ is minimal. When the evaluation function $f(P)$ is minimal, $e_1(P)$ and $e_2(P)$ can both be restricted. When $$\nabla f(P)=2(A_1^T A_1 P-A_1^T Z)+2w(A_2^T A_2 P-A_2^T U)+2w(A_3^T A_3 P-A_3^T V)=0,$$

$$P=(A_1^T A_1+wA_2^T A_2+wA_3^T A_3)^{-1}(A_1^T Z+wA_2^T U+wA_3^T V).$$

The final freeform surface shape $\omega_{opt}$ can be achieved by obtaining root means square radius of defocused spots of the plurality of freeform surface shapes $z=f(x, y; P)$, and selecting one of the plurality of freeform surface shapes $z=f(x, y; P)$ having a minimum root mean square radius of a defocused spot as the final freeform surface shape $\omega_{opt}$.

EXAMPLE 1

Referring to FIG. 2, an LED point light source 10 is taken as origin O and a three-dimensional Cartesian coordinate system Oxyz is constructed. A freeform surface 122 and z axis intersect at C=(0, 0, 10 mm). A cone beam is emitted from the LED point light source 10 and centered on the +z axis with one half of an angular aperture being 10°. The cone beam passes through the freeform surface 122 and forms a rectangular illuminated field 142 having a length of 30 mm and a width of 20 mm on a receiving surface 14. The receiving surface 14 is parallel to xy plane and intersects the z axis at T=(0, 0, 50 mm). Based on the above conditions, a plurality of data points of the freeform surface 122 are obtained through a differential equation method and further fitted with a fourth order XY-polynomial as a prototype, wherein the fourth order XY-polynomial can be expressed in terms of the following equation:

$$z=P_0+P_1x^2+P_2y^2+P_3x^4+P_4x^2y^2+P_5y^4$$

Coefficients of the fourth order XY-polynomial are obtained as follows: P0=10, P1=0.0767, P2=−0.0130, P3=−0.0088, P4=0.0235, P5=−0.0041, wherein the weighting w is 100. Finally, a freeform surface lens entity 12 is constructed based on a final freeform surface shape and an LED freeform surface illumination system 100 is established. The material of the freeform surface lens entity 12 is PMMA and the refractive index of the freeform surface lens 12 is 1.5198.

Figure 3:
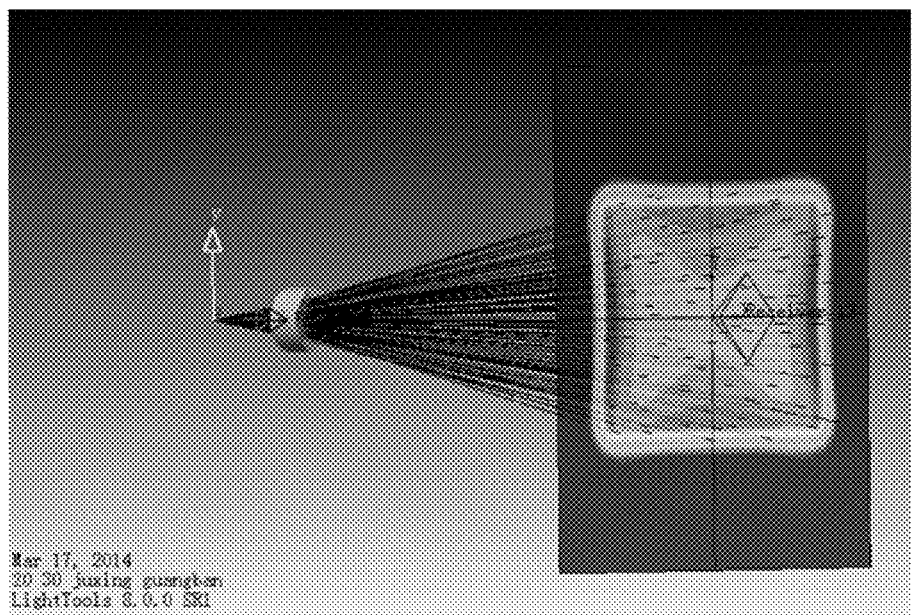
FIG. 3 is a diagram showing a ray tracing simulation of a freeform surface constructed using LIGHTTOOLS version 8.0 SR1 in the design method of LED freeform surface illumination system based on XY-polynomial in the first example.
Figure 4:
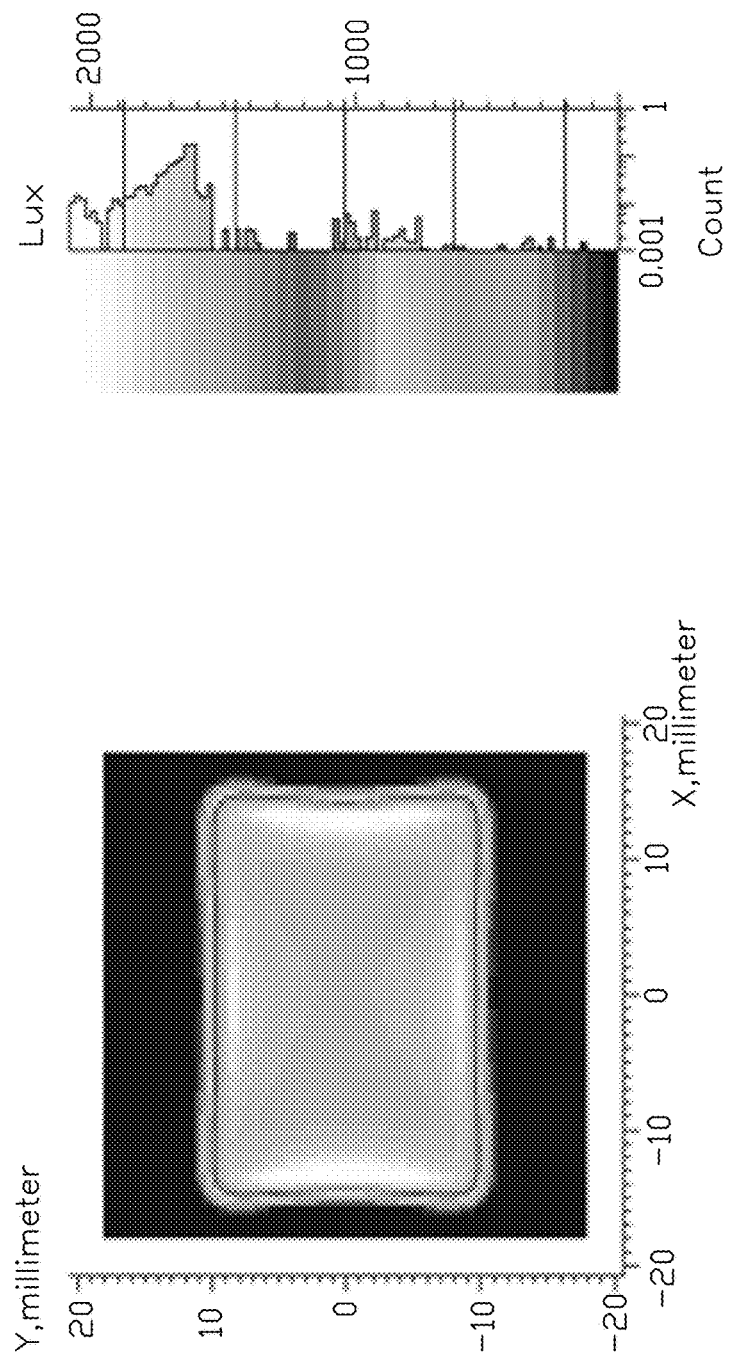
FIG. 4 is an illuminating effect image of a rectangular illuminated field formed through the freeform surface in the design method of LED freeform surface illumination system based on XY-polynomial in the first example.
Figure 5:
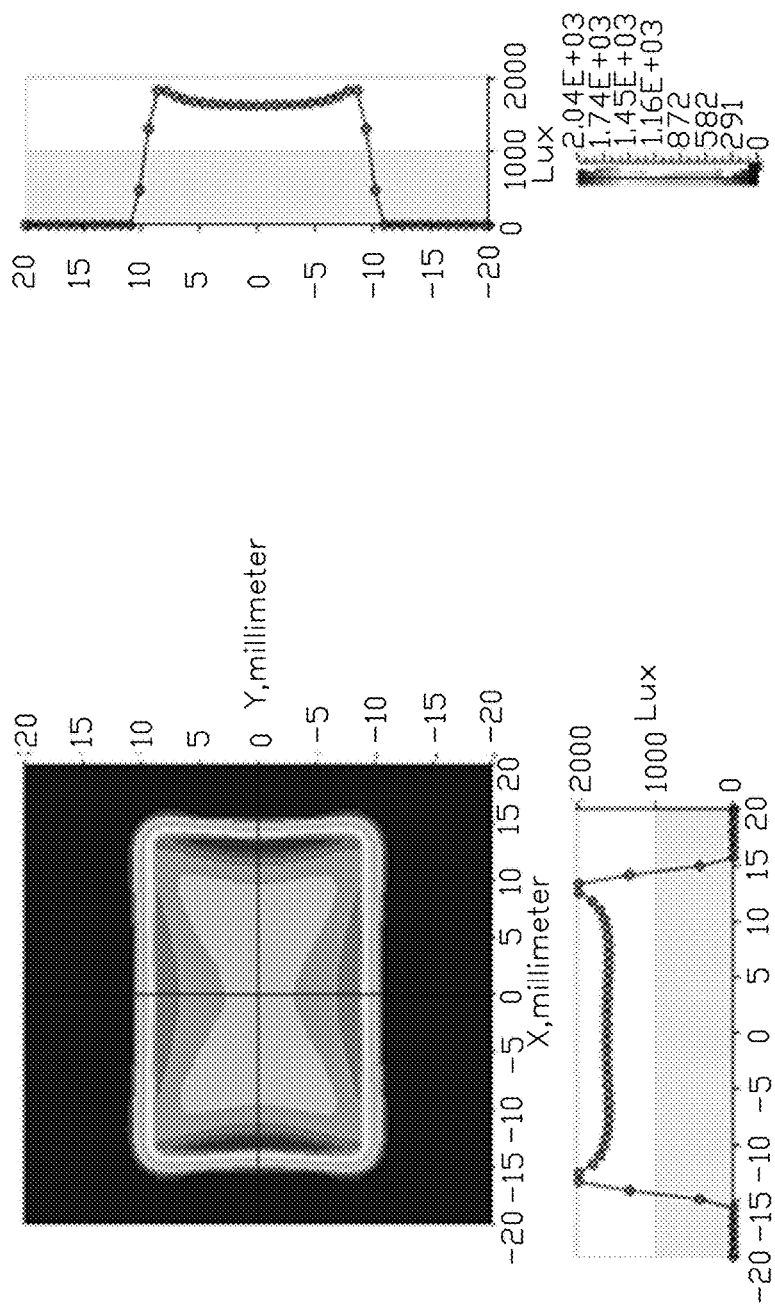
FIG. 5 is a diagram showing illuminance distributions on x axis and y axis of the rectangular illuminated field formed through the freeform surface in the design method of LED freeform surface illumination system based on XY-polynomial in the first example.

Referring to FIGS. 3~5, FIG. 3 is diagram showing a ray tracing simulation of the freeform surface 122 constructed using LIGHTTOOLS version 8.0 SR1. FIG. 4 is an illuminating effect image of the rectangular illuminated field 142 formed through the freeform surface 122. FIG. 5 is a diagram showing illuminance distributions on x axis and y axis of the rectangular illuminated field 142 formed through the freeform surface 122. FIGS. 3~5 illustrate that the uniformity of the rectangular illuminated field 142 is almost complete, and the shape and size match the design requirement. The energy utilization efficiency of the LED freeform surface illumination system 100 can reach 99.892%. The illumination uniformity of the rectangular illuminated field 142 can reach 1672.0 lux/1815.8 lux=92.08%.

EXAMPLE 2

A design method of the second example is substantially the same as the design method of the first example, except that the cone beam forms a square illuminated field with its side as 20 mm. Coefficients of the fourth order XY-polynomial are obtained as follows: $P_0$=10, $P_1$=−0.0095, $P_2$=−0.0095, $P_3$=−0.0047, $P_4$=0.0222, $P_5$=−0.0047, wherein the weighting w is 10.

Figure 6:
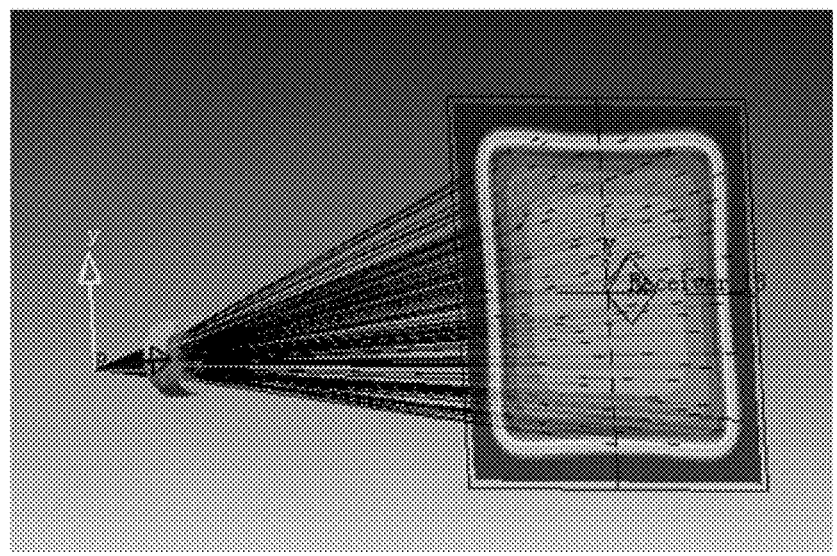
FIG. 6 is a diagram showing a ray tracing simulation of a freeform surface constructed using LIGHTTOOLS version 8.0 SR1 in the design method of LED freeform surface illumination system based on XY-polynomial in a second example.
Figure 7:
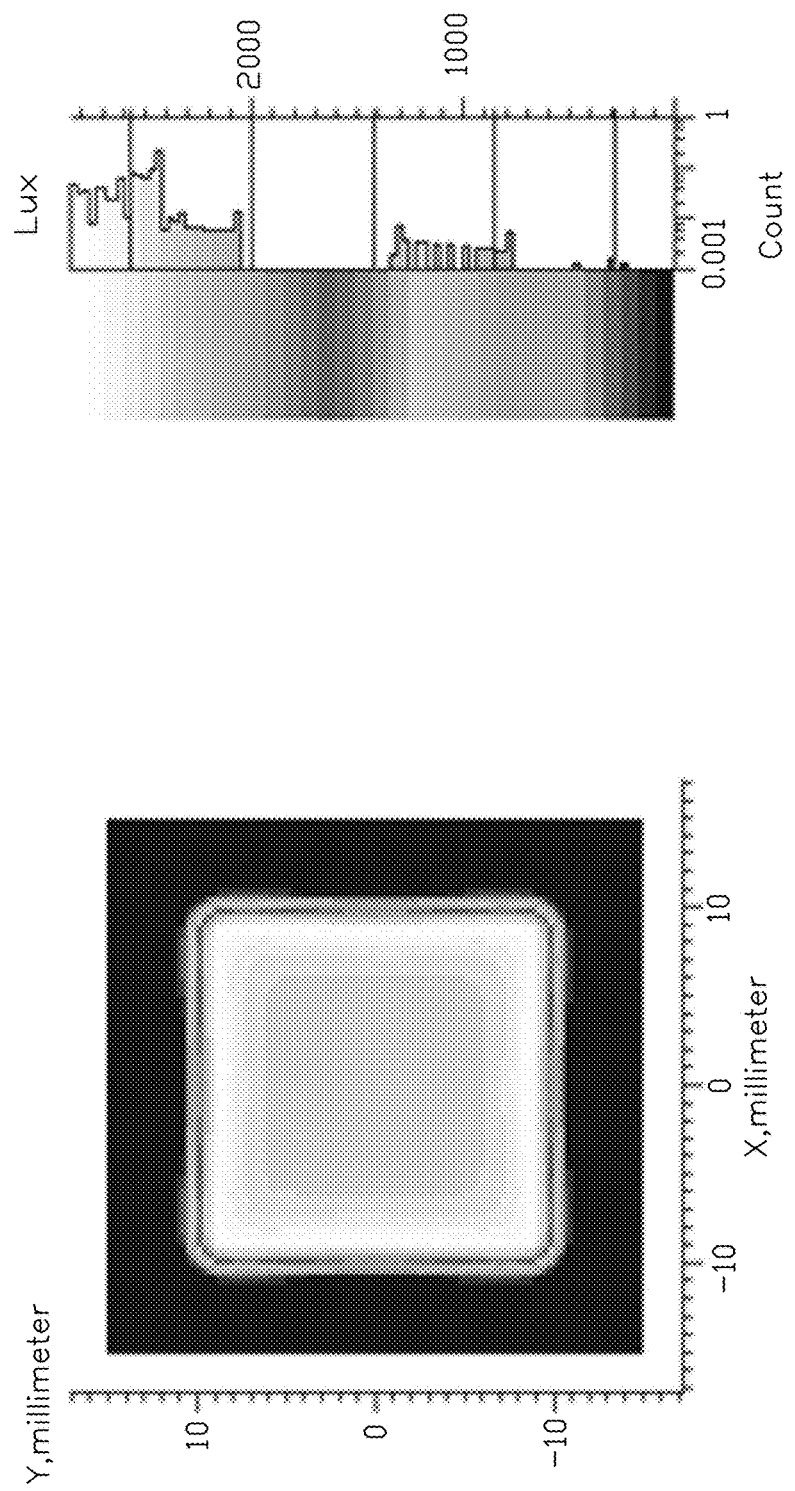
FIG. 7 is an illuminating effect image of a square illuminated field formed through the freeform surface in the design method of LED freeform surface illumination system based on XY-polynomial in the second example.
Figure 8:
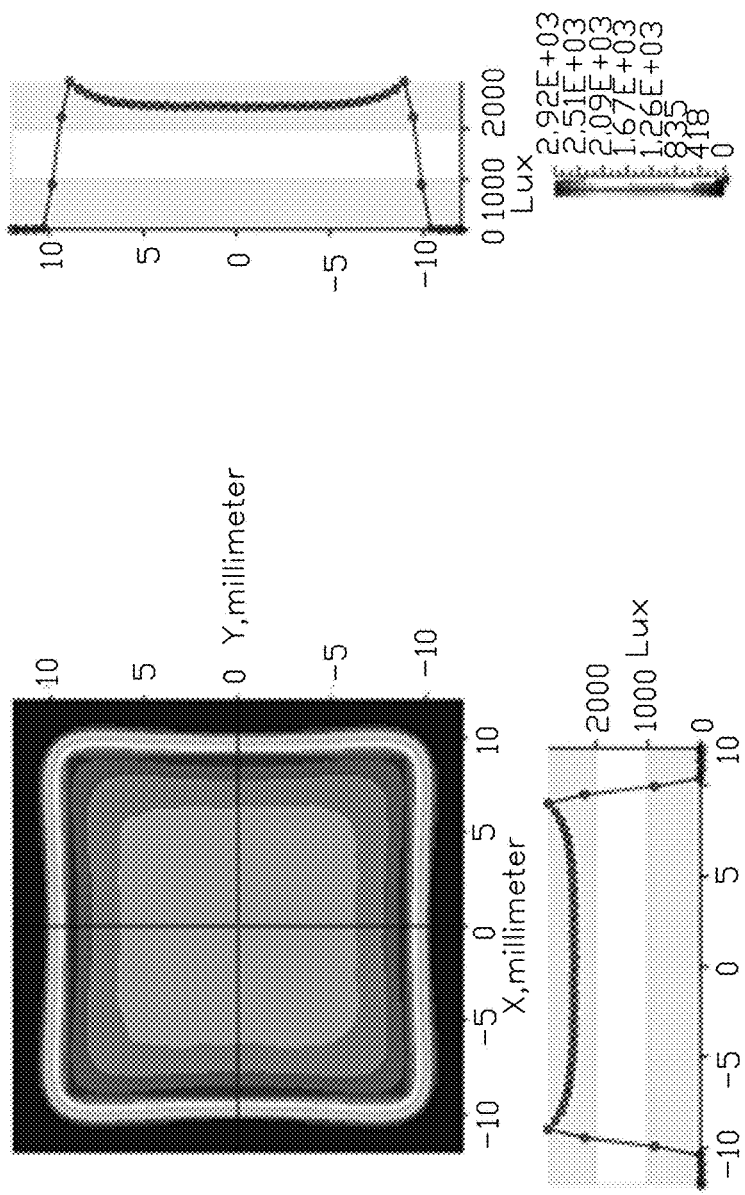
FIG. 8 is a diagram showing illuminance distributions on x axis and y axis of the square illuminated field formed through the freeform surface in the design method of LED freeform surface illumination system based on XY-polynomial in the second example.

Referring to FIGS. 6~8, FIG. 6 is a diagram showing a ray tracing simulation of a freeform surface constructed using LIGHTTOOLS version 8.0 SR1. FIG. 7 is an illuminating effect image of the square illuminated field formed through the freeform surface. FIG. 8 is a diagram showing illuminance distributions on x axis and y axis of the square illuminated field formed through the freeform surface. FIGS. 6~8 illustrate that the illumination uniformity of the square illuminated field is almost complete, and the shape and size match the design requirement. The energy utilization efficiency of the LED freeform surface illumination system can reach 99.892%. The illumination uniformity of the square illuminated field can reach 91.2%.

EXAMPLE 3

Figure 9:
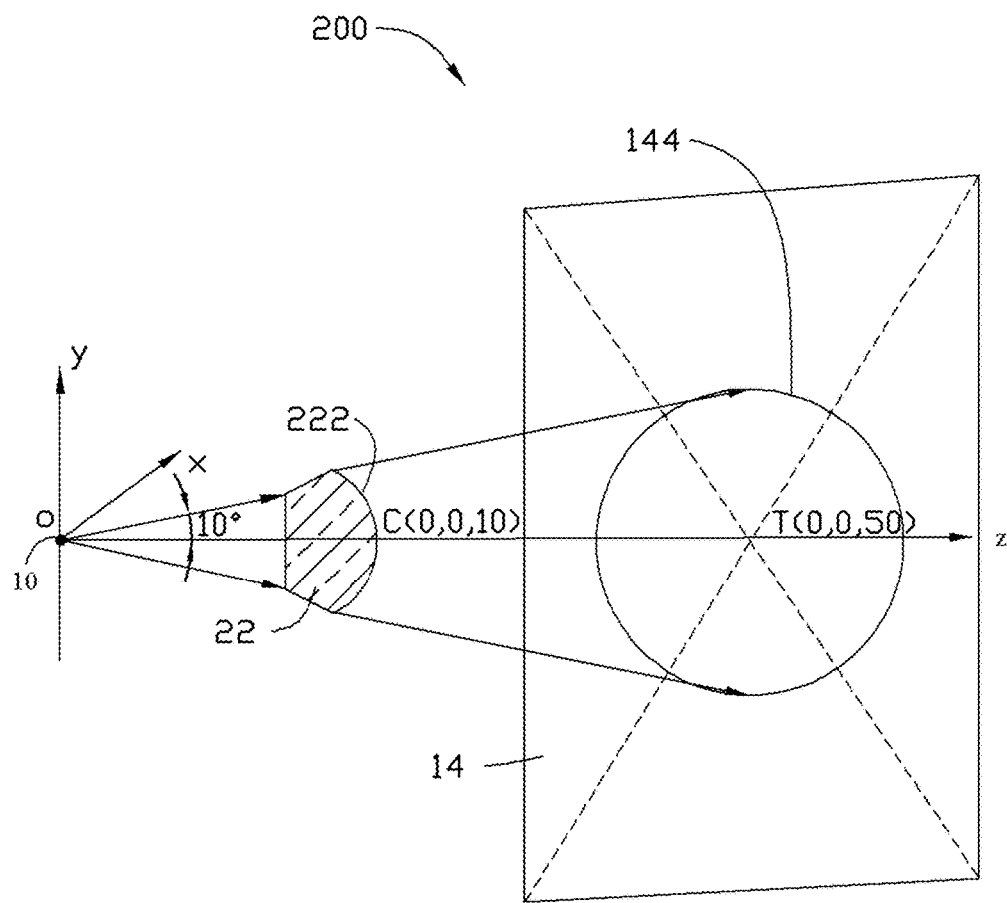
FIG. 9 is a schematic view showing a third example of an LED freeform surface illumination system in the design method of LED freeform surface illumination system based on XY-polynomial.

Referring to FIG. 9, the LED point light source 10 is taken as origin O and the three-dimensional Cartesian coordinate system Oxyz is constructed. A freeform surface 222 and the z axis intersect at C=(0, 0, 10 mm). The cone beam is emitted from the LED point light source 10 and is centered on the +z axis with the one half of the angular aperture being 10°. The cone beam passes through the freeform surface 222 and forms a circular illuminated field 144 of radius 10 mm on the receiving surface 14. The receiving surface 14 is parallel to xy plane and intersects the z axis at T=(0, 0, 50 mm). Based on the above conditions, a plurality of data points of the freeform surface 222 are obtained through differential equation method and further fitted with fourth order XY-polynomial as prototype, wherein the fourth order XY-polynomial can be expressed as the following equation:

$$z=P_0+P_1x^2+P_2y^2+P_3x^4+P_4x^2y^2+P_5y^4$$

Coefficients of the fourth order XY-polynomial are obtained as follows: P0=10, P1=−0.11944, P2=−0.11961, P3=−0.0011174, P4=3.2382e-005, P5=−0.0010470, wherein the weighting w is 100. Finally, a freeform surface lens entity 22 is constructed based on a final freeform surface shape and an LED freeform surface illumination system 200 is established. The material of the freeform surface lens entity 22 is same as that of the freeform surface lens 12.

Figure 11:
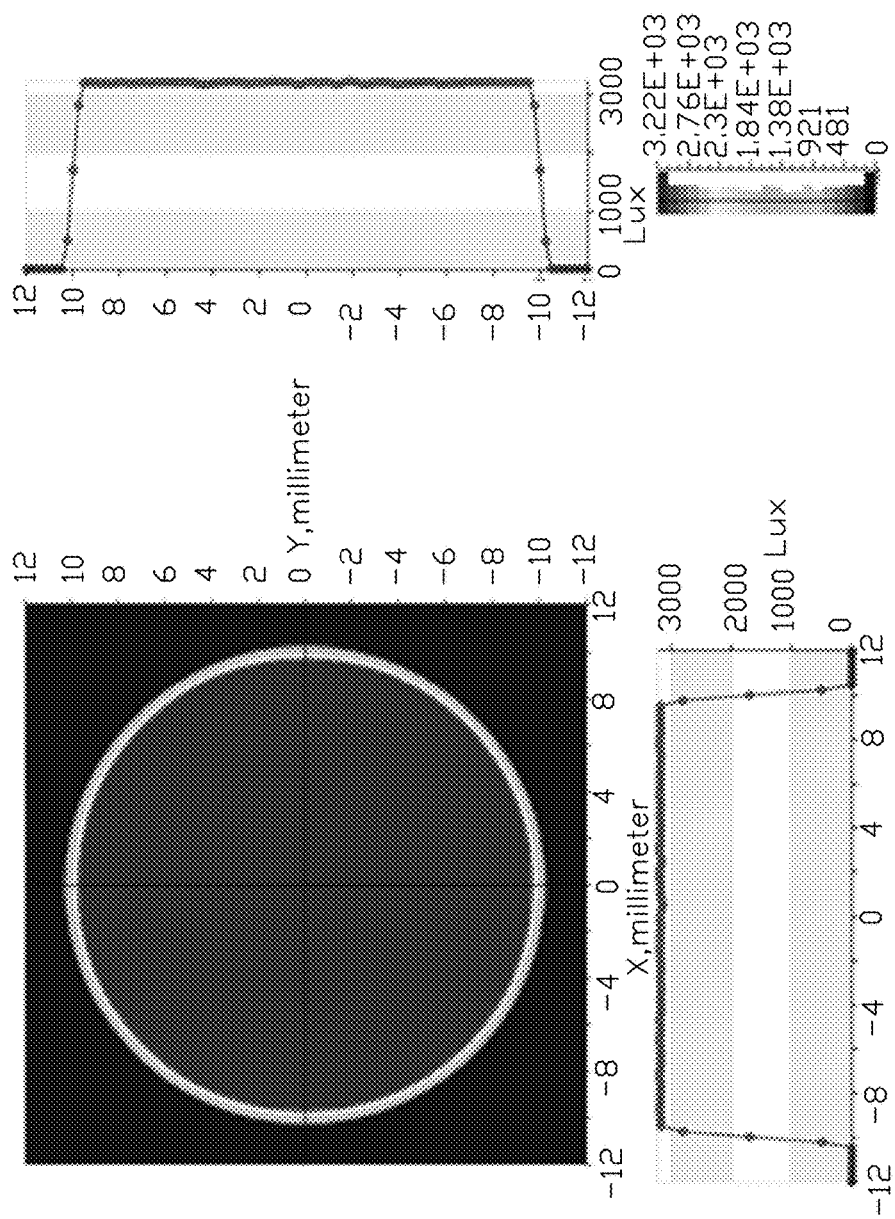
FIG. 11 is a diagram showing illuminance distributions on x axis and y axis of the circular illuminated field formed through the freeform surface in the design method of LED freeform surface illumination system based on XY-polynomial in the third example.

Referring to FIGS. 10~11, FIG. 10 is an illuminating effect image of the circular illuminated field 144 formed through the freeform surface 222. FIG. 10 is a diagram showing illuminance distributions on x axis and y axis of the circular illuminated field 144 formed through the freeform surface 222. FIGS. 10~11 illustrate that the illumination uniformity of the circular illuminated field 144 is almost complete, and the shape and size match the design requirement. The energy utilization efficiency of the LED freeform surface illumination system 200 can reach 99.994%. The illumination uniformity of the circular illuminated field 144 can reach 99.88%.

In the present method, the coordinate value and the normal vector of each data point are investigated hypothetically. The coordinate value and the normal vector of the freeform surfaces can be satisfied at different levels simultaneously. Any deviations of the coordinate value and the normal vector of the freeform surfaces can be controlled within an acceptable range. Thus, a uniform illumination can be obtained and the energy utilization efficiency can be improved.

Depending on the embodiment, certain of the steps of methods described may be removed, others may be added, and the sequence of steps may be altered. It is also to be understood that the description and the claims drawn to a method may comprise some indication in reference to certain steps. However, the indication used is only to be viewed for identification purposes and not as a suggestion as to an order for the steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A design method for constructing a freeform surface lens entity for use in a LED freeform surface illumination system based on XY-polynomial comprising:

step (S1), obtaining a plurality of data points of a freeform surface according to an LED point light source and an illuminated field on a receiving surface formed by the LED point light source in a three-dimensional Cartesian coordinate system Oxyz, wherein light emitted from the LED point light source and passing through the freeform surface provides an uniform illumination to the illuminated field, each of the plurality of data points comprises a coordinate value $Q_i=(x_i, y_i, z_i)(i=1, 2, \ldots, n)$ and a normal vector $N_i=(u_i, v_i, -1)(i=1, 2, \ldots, n)$, and the freeform surface is expressed in terms of $$z = f(x, y; P) = \sum_{i,j=0} P_{i,j} x^i y^j,$$

wherein the P is a XY-polynomial coefficient;

step (S2), acquiring a first sum of squares $e_1(P)$, of coordinate differences in z direction between the coordinate value $Q_i=(x_i, y_i, z_i)(i=1, 2, \ldots, n)$ and the freeform surface, wherein the first sum of squares $e_1(P)$ is expressed in terms of a first equation:

$$e_1(P) = \sum_{i=1}^{n} [z_i - f(x_i, y_i; P)]^2 = (Z - A_1 P)^T (Z - A_1 P),$$

wherein $Z = [z_1 \ z_2 \ \ldots \ z_n]^T,$ $$A_1 = \begin{bmatrix} 1 & x_1 & y_1 & x_1^2 & x_1 y_1 & y_1^2 & x_1^3 & x_1^2 y_1 & x_1 y_1^2 & y_1^3 & \ldots \\ 1 & x_2 & y_2 & x_2^2 & x_2 y_2 & y_2^2 & x_2^3 & x_2^2 y_2 & x_2 y_2^2 & y_2^3 & \ldots \\ & & & \ldots & & & \ldots & & \ldots & & \\ 1 & x_n & y_n & x_n^2 & x_n y_n & y_n^2 & x_n^3 & x_n^2 y_n & x_n y_n^2 & y_n^3 & \ldots \end{bmatrix}$$

$P = [P_{00} \ P_{10} \ P_{01} \ P_{20} \ P_{11} \ P_{02} \ P_{30} \ P_{21} \ P_{12} \ P_{03} \ \ldots]^T;$ wherein step (S3), acquiring a second sum of squares $e_2(P)$, of modulus of vector differences between the normal vector $N_i=(u_i, v_i, -1, 2, \ldots, n)$ of the plurality of data points and a second normal vector $n_i$ of the freeform surface, wherein the second sum of squares $e_2(P)$ is expressed in terms of a second equation:

$$e_2(P) = \sum_{i=1}^{n} |N_i - n_i|^2 = \sum_{i=1}^{n} \{[u_i - f_x(x_i, y_i; P)]^2 + [v_i - f_y(x_i, y_i; P)]^2\} =$$

$$(U - A_2 P)^T (U - A_2 P) + (V - A_3 P)^T (V - A_3 P),$$

wherein $n_i = (f_x(x, y; P), f_y(x, y; P), -1),$ $U = [u_1 \ u_2 \ \ldots \ u_n]^T,$ $V = [v_1 \ v_2 \ \ldots \ v_n]^T,$ $A_2 =$ $$\begin{bmatrix} 0 & 1 & 0 & 2x_1 & y_1 & 0 & 3x_1^2 & 2x_1 y_1 & y_1^2 & 0 & 4x_1^3 & 3x_1^2 y_1 & 2x_1 y_1^2 & y_1^3 & 0 & \ldots \\ 0 & 1 & 0 & 2x_2 & y_2 & 0 & 3x_2^2 & 2x_2 y_2 & y_2^2 & 0 & 4x_2^3 & 3x_2^2 y_2 & 2x_2 y_2^2 & y_2^3 & 0 & \ldots \\ & & & & \ldots & & & \ldots & & & & \ldots & & & & \\ 0 & 1 & 0 & 2x_n & y_n & 0 & 3x_n^2 & 2x_n y_n & y_n^2 & 0 & 4x_n^3 & 3x_n^2 y_n & 2x_n y_n^2 & y_n^3 & 0 & \ldots \end{bmatrix},$$

$A_3 =$ $$\begin{bmatrix} 0 & 0 & 1 & 0 & x_1 & 2y_1 & 0 & x_1^2 & 2x_1 y_1 & 3y_1^2 & 0 & x_1^3 & 2x_1^2 y_1 & 3x_1 y_1^2 & 4y_1^3 & 0 & \ldots \\ 0 & 0 & 1 & 0 & x_2 & 2y_2 & 0 & x_2^2 & 2x_2 y_2 & 3y_2^2 & 0 & x_2^3 & 2x_2^2 y_2 & 3x_2 y_2^2 & 4y_2^3 & 0 & \ldots \\ & & & & & \ldots & & & \ldots & & & & \ldots & & & & \\ 0 & 0 & 1 & 0 & x_n & 2y_n & 0 & x_n^2 & 2x_n y_n & 3y_n^2 & 0 & x_n^3 & 2x_n^2 y_n & 3x_n y_n^2 & 4y_n^3 & 0 & \ldots \end{bmatrix};$$

wherein step (S4), proposing an evaluation function $f(p)=e_1(P)+we_2(P)$, wherein w is a weighting greater than 0;

step (S5), selecting different weightings w, and then setting a gradient $\nabla f(P)$ of the evaluation function $f(p)$ equal to 0 to obtain a plurality of different values of P and a plurality of freeform surface shapes $z=f(x, y; P)$ corresponding to each of the plurality of different values of P, wherein the gradient $\nabla f(P)$ of the evaluation function $f(P)$ is as follows:

$\nabla f(P)=2(A_1^T A_1 P - A_1^T Z)+2w(A_2^T A_2 P - A_2^T U)+2w(A_3^T A_3 P - A_3^T V);$ step (S6), choosing a final freeform surface shape $\Omega_{opt}$ from the plurality of freeform surface shapes $z=f(x, y; P)$ according to root mean square radius of defocused spots of the plurality of freeform surface shapes $z=f(x, y; P)$;

step (S7), constructing a freeform surface lens entity based on the final freeform surface shape $\Omega_{opt}$ and establishing the LED freeform surface illumination system comprising the freeform surface lens entity.

2. The design method of claim 1, wherein the plurality of data points are obtained through a differential equation method.

3. The design method of claim 1, wherein the XY-polynomial is a third order XY-polynomial, a fourth order XY-polynomial, a fifth order XY-polynomial or a sixth order XY-polynomial.

4. The design method of claim 1, wherein the step (S6) further comprises:

obtaining root mean square radius of defocused spots of the plurality of freeform surface shapes $z=f(x, y; P)$; and selecting one of the plurality of freeform surface shapes $z=f(x, y; P)$ having a minimum root mean square radius of a defocused spot as the final freeform surface shape $\Omega_{opt}$.

5. The design method of claim 1, wherein one half of an emitting angle of the LED point light source is less than or equal to 20°.

6. The design method of claim 5, wherein the one half of the emitting angle of the LED point light source is less than or equal to 10°.

\* \* \* \* \*